(No Model.)
J. B. ADLER.
SCREW.
No. 497,510. Patented May 16, 1893.
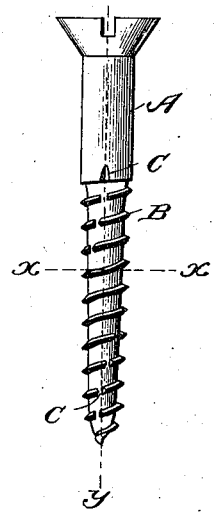
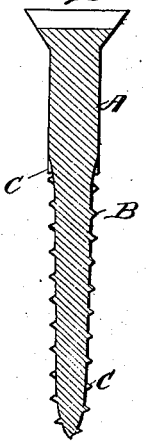
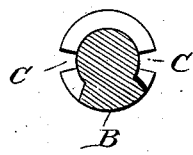
Witnesses
Edwin L. Bradford
Sam'l H. Jacobson
Inventor
Joseph B. Adler
by Lewis Abraham
Attorney

UNITED STATES PATENT OFFICE.

JOSEPH B. ADLER, OF NEW YORK, N. Y.

SCREW.

SPECIFICATION forming part of Letters Patent No. 497,510, dated May 16, 1893.

Application filed June 11, 1892. Serial No. 436,343. (No model.)

*To all whom it may concern:*

Be it known that I, JOSEPH B. ADLER, a citizen of the United States, residing in the city of New York, in the county and State of New York, have invented a certain new and useful Improvement in Screws, of which the following is a specification.

Heretofore great difficulty has been encountered in successfully inserting a screw into hard wood or thin strips of material near the edges, by reason of the liability of the wood to split caused by the fiber of the material cut by the threads to expand and be compressed as the screw is inserted thereby necessitating the use of a gimlet to prepare a path for the screw.

My invention relates to screws for use in such woods or material, the object being to provide a screw of simple and cheap construction, which can be more easily inserted and which will be not only more difficult to extract than the ordinary screw but also one that can be used near the edges of hard wood or with thin strips of material without danger of splitting the same.

In the drawings Figure 1 represents a side elevation of my improved screw. Fig. 2 is a transverse section of the same on the line x x Fig. 1. Fig. 3 is a vertical section on line y, y, of Fig. 1.

In the drawings similar letters of reference designate corresponding parts in all figures.

A designates the shank or stem of the screw made of any suitable material.

B designates the threads of the screw.

C designates a series of grooves or channels extending around the stem in a spiral form intersecting the threads from the point of the screw said grooves or channels being of longer curve than that of the threads of the screw. I find that substantially the same effect may be produced by cutting a series of straight channels through the threads of the screw lengthwise of the stem but the expense of such construction is too great for practical use.

It will be seen that in a screw made according to my invention the grooves or channels extending spirally around the stem only intersecting the threads, allow the fiber compressed by the threads to expand therein, and form cutting edges thereon wherewith to cut said fiber in the continued insertion of the screw; also that if my improved screw be hammered in instead of cutting a round hole, the grooves extending spirally externally around the stem will cause the screw to turn by reason of the fiber entering the grooved channels thus holding the screw more securely than the ordinary screw. The channels C, see Fig. 2, simply cut away portions of the threads, B, and do not enter the stem. The normal diameter of the barrel is thus maintained intact, its whole length; a small length of said channels may however, at their upper terminals, be sunk into the head of the barrel or stem, above which terminals said head is of uniform diameter between its flanged disk and the uppermost thread, B.

I deem as an important feature of my invention and improvement on analogous devices, the maintaining of the stem of uniform diameter, its full length. It is manifest that the barrel of a screw, if cut into by grooves, will be weakened. If a screw so conformed be driven by blows into wood, or other resisting substance, it will be apt to bend from a true axial line. The same results will be effected while such a device is being inserted by forcible revolution, especially in the portions that have not entered the material into which insertion is being made. Such diversion, however slight, will result in a series of bends, forming knees and elbows, and there will be no true axial bore for the main barrel of the screw. My device not only provides spiral cutting edges at the peripheral line of the several threads, B, but in addition thereto sharp entering points, where said threads are intersected by the channels, C; at the same time open ways are made in the wood or other material for reception of fibers or splints of such material as removed therefrom.

What I claim as new, and desire to secure by Letters Patent, is—

1. As a new article of manufacture a screw having its outwardly extending threads intersected by a series of spiral channels of longer pitch than said threads, said channels cutting away portions of the threads their full depth, the barrel of the device being maintained solid its full length, substantially as described.

2. In a screw having its threaded portion provided with a series of channels, of longer pitch than the threads, spirally cut along said threads and intersecting them in succession their full depth, said channels terminating at the peripheral surface of the barrel or stem, in combination with solid head of larger diameter than the barrel, said head supplied with an upper flanged disk adapted to be engaged by a suitable instrument to insert the device into material, substantially as described.

JOS. B. ADLER.

Witnesses:
S. RANDALL,
HENRY McCLOSKEY.